United States Patent [19]

Baccini

[11] Patent Number: 4,643,266

[45] Date of Patent: Feb. 17, 1987

[54] SCALES

[76] Inventor: Giovanni Baccini, Via del Pignone, 30R - 50142 Firenze, Italy

[21] Appl. No.: 764,477

[22] Filed: Aug. 12, 1985

[30] Foreign Application Priority Data

Oct. 17, 1984 [IT] Italy .............................. 23539/84[U]

[51] Int. Cl.$^4$ ...................... G01G 23/14; G01G 21/08
[52] U.S. Cl. ..................................... 177/169; 177/258
[58] Field of Search ............................... 177/168–170, 177/256–259

[56] References Cited

U.S. PATENT DOCUMENTS 3,426,861  2/1969  Provi .............................. 177/168 X
3,759,338  9/1973  Petersen et al. ................ 177/256 X Primary Examiner—George H. Miller, Jr.
Attorney, Agent, or Firm—Shlesinger, Fitzsimmons & Shlesinger

[57] ABSTRACT

Scales of the type comprised of a base carrying a weighing platform, a lever system with a weighing spring being interposed between said base and said platform, wherein the lower end of said spring is flattened and urges against said base, and the upper end of said spring is threaded through a cover, said lever system being tied to said cover so that said spring can be calibrated by screwing more or less said spring through said cover.

2 Claims, 3 Drawing Figures

SCALES

The present invention relates to improved scales of the type used at home for weighing people.

The scales of such a type which are presently found on the market have a weight from 4.5 to 6 cm approximately; despite such a height may appear a little one, said scales are subject to upsetting if the user does not place correctly his feet on the weighing platform. This is a dangerous drawback, especially for aged people who quite often experience a precarious equilibrium.

It is therefore exceedingly desirable to provide scales with the center of gravity located lower than the known scales.

If one examines the structure of the known scales, it is observed that the height is mostly determined by the weighing spring which operates under tensile stress, the calibration means for said spring, and the connection arrangement to the lever system of the scales.

In fact, said spring is vertically suspended to supporting means having a certain height, includes a calibration register located among its turns, and downwardly is provided with a suspension hook for the levers of the scales.

Therefore the dimensions due to the thickness of said calibration register, the dead turns over the calibration register, the supporting means and the hook of the spring add to the dimensions of the active turns of said spring.

The main object of the present invention is to eliminate the above mentioned drawback, i.e. the upsetting of the known scales, by further lowering the center of gravity by modifications of the general structure of the assembly comprised of the weighing spring, the calibration register of said spring, and the connection arrangement of the lever system of the scales.

To this end, according to the invention, it is provided scales of the type comprised of a base carrying a weighing plateform or scale, a lever system with a weighing spring being interposed between said base and said platform, characterized in that the lower end of said spring is flattened and urges against said base, and the upper end of said spring is threaded through a cover, said lever system being tied to said cover.

The structural and functional characteristics together with the advantages of the invention in comparison with the known scales will appear more clearly from the following description taken together with the accompanying drawings, which show a non-limiting examples of scales built up according to the principles of the invention. In the drawings.

Figure 1:
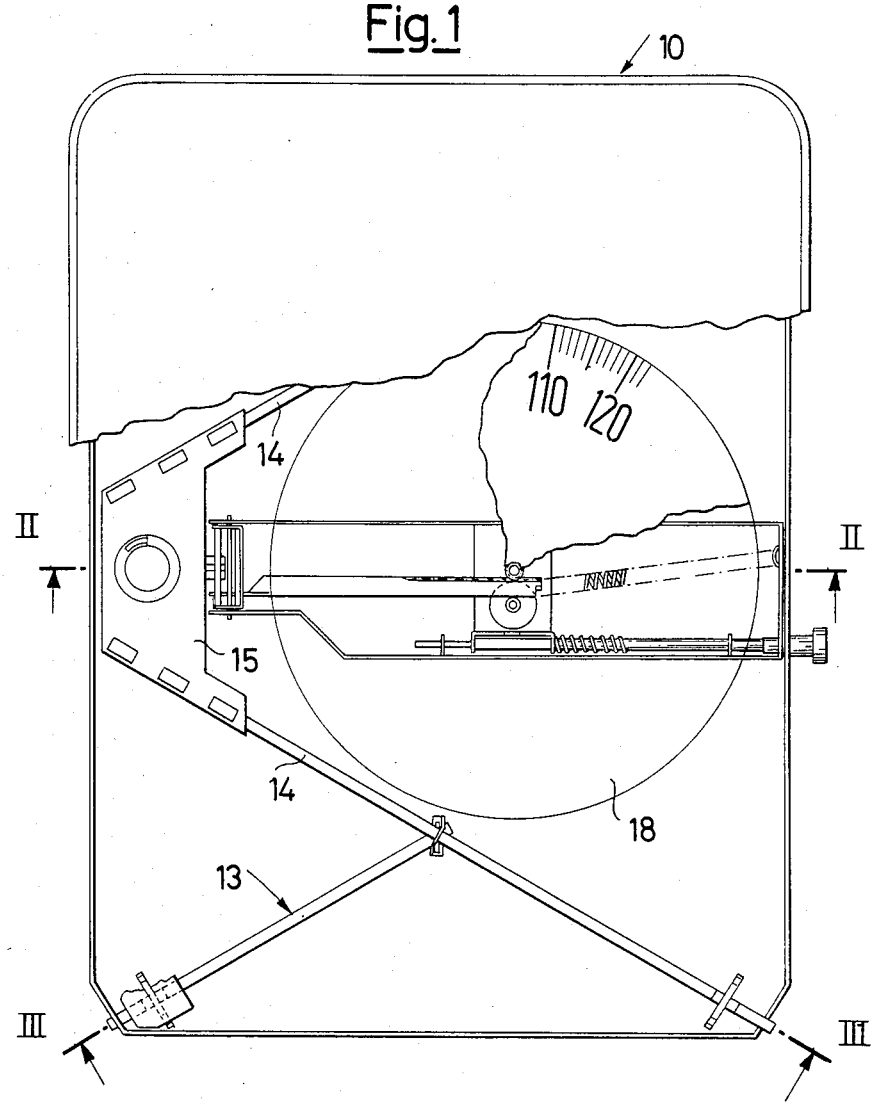
FIG. 1 is a plan view with parts broken away and showing scales according to the invention.
Figure 2:
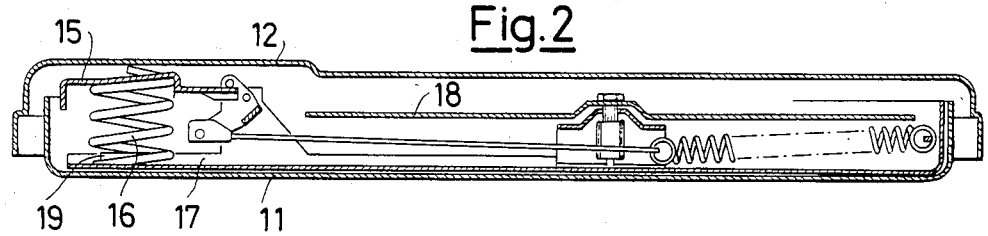
FIG. 2 is a sectional view taken along the line II—II of FIG. 1.
Figure 3:
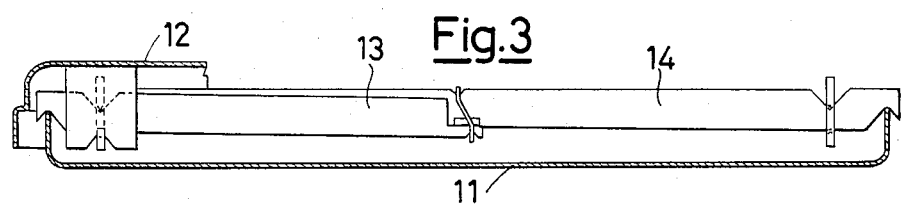
FIG. 3 is a sectional view taken along the line III—III of FIG. 1.

In the drawings the scales of the invention are generally designated by the reference numeral 10 and is structurally comprised of a bottom base 11 and an upper weighing platform 12, both of which being box-shaped and partially inserted one within the other. The weighing platform 12 rests on a weighing lever system known per se which is generally designated by the reference numeral 13. According to the invention, the transmission levers 14 of said lever system are integral with a metal sheet cover 15 on which operates the upper end of a weighing spring 16, the lower end of said spring being flattened and made secure with the bottom wall of a box-shaped member 17 which contains a conventional rack and pinion arrangement for actuating a disc 18 on which the weight is displayed. The last turn of the spring 16 is fixed to the box member 17 by means of press fitting it frictionally over a drawn portion or boss 19 provided on said member 17.

In this way the setting and locking steps for the spring 16, during the manufacturing process can be advantageously performed by turning the spring with sufficient force to cause its lower end to slip and rotate around boss 19, thus screwing the upper end of spring 16 through a hole provided in said cover 15, and then cutting off the turns resulting above the cover, since these turns do not intervene in the weighing operation. The number of turns, and therefore the power of the spring can be therefore modified by means of a system which does not occupy any further volume besides the height of the spring and the cover; above the cover it is arranged immediately the weighing platform.

Scales made as above can have a height of 2.5 cm approximately, and then a very low position of the center of gravity, thus eliminating any danger of upsetting.

I claim:

1. In a scale of the type having a base carrying a weighing platform, and a lever system with a weighing spring interposed between said base and said platform, the improvement characterized in that said spring is a compression spring having its lower end adjustably secured to a flat member which is urged against said base, and having its upper end threaded through a cover which is supported for vertical movement of said spring, said lever system being tied to said cover so that said spring can be calibrated by screwing more or less of the upper end of said spring through said cover.

2. A scale according to claim 1, characterized in that the said spring is a coiled compression spring, and the lower end turn of said spring is frictionally press fit over a boss formed on said flat member.

* * * * *